United States Patent
Schreiber et al.

(10) Patent No.: US 7,035,123 B2
(45) Date of Patent: Apr. 25, 2006

(54) FREQUENCY CONVERTER AND ITS CONTROL METHOD

(75) Inventors: Dejan Schreiber, Nürnberg (DE); Olli Pyrhönen, Lappeenranta (FI); Pertti Silventoinen, Lappeenranta (FI); Risto Komulainen, Klaukkala (FI)

(73) Assignees: Vacon Oyj, Vaasa (FI); Semikron Elektronik GmbH, Nuremberg (DE)

( * ) Notice: Subject to any disclaimer, the term of this patent is extended or adjusted under 35 U.S.C. 154(b) by 77 days.

(21) Appl. No.: 10/766,927

(22) Filed: Jan. 30, 2004

(65) Prior Publication Data

US 2005/0007799 A1    Jan. 13, 2005

(30) Foreign Application Priority Data

Jul. 7, 2003    (EP) ................... 03077175

(51) Int. Cl.
*H02M 5/45*    (2006.01)

(52) U.S. Cl. ..................... 363/37; 363/34; 363/143
(58) Field of Classification Search ............... 363/34, 363/37, 39, 143, 98; 318/722, 438, 811, 318/805

See application file for complete search history.

(56) References Cited

FOREIGN PATENT DOCUMENTS

| DE | 44 28 682 A1 | 2/1996 |
|---|---|---|
| DE | 100 44 574 A1 | 3/2001 |

*Primary Examiner*—Rajnikant B. Patel
(74) *Attorney, Agent, or Firm*—Birch, Stewart, Kolasch & Birch, LLP

(57) ABSTRACT

Method of controlling a voltage controlled PWM (Pulse Width Modulated) frequency converter comprising a single phase rectifier bridge (10) connectable to a sinusoidal single phase supply, a DC intermediate circuit (11) and a controlled inverter bridge (12) for generating an AC output voltage with varying amplitude and frequency to a load, said inverter bridge (12) having PWM controlled semiconductor switches (V11–V16) and flywheel diodes (D11–D16) connected in inverse-parallel with the semiconductor switches, wherein the DC intermediate circuit (11) is provided with a DC capacitor unit, and wherein the frequency converter is controlled so that the supply line current ($I_{in}$) is essentially sinusoidal and in phase with the supply line voltage ($U_{in}$). The inverter bridge is controlled so that the curve of filtered average current ($I_{dc}$) in the DC intermediate circuit follows essentially the curve of the rectified AC supply voltage ($U_{dc}$), the rectifier bridge is (10) connected to the inverter bridge (12) directly without a DC capacitor unit acting as an intermediate energy storage, and the curve of the power fed to the load has essentially the form $\sin^2(2\pi ft)$ (f=line frequency t=time).

7 Claims, 2 Drawing Sheets

FREQUENCY CONVERTER AND ITS CONTROL METHOD

CROSS-REFERENCE TO RELATED APPLICATION

This Nonprovisional application claims priority under 35 U.S.C. § 119(a) on Patent Application No. 03077175.2 filed in EUROPE on Jul. 7, 2003, the entire contents of which are hereby incorporated by reference.

BACKGROUND OF THE INVENTION

1. Field of the Invention

The present invention relates to a voltage controlled PWM (Pulse Width Modulated) frequency converter comprising a single phase rectifier bridge, a DC intermediate circuit and a controlled inverter bridge for generating an AC output voltage with varying voltage and frequency. The present invention also relates to a method for controlling such a frequency converter.

2. Description of Background Art

FIG. 1a presents a prior art single phase PWM frequency converter. It comprises a rectifier bridge 10 for rectifying an AC voltage $U_{in}$ of a supply line to a DC voltage $U_{dc}$ for a DC intermediate circuit 11 and an inverter bridge 12 for the inversion of the intermediate circuit DC voltage $U_{dc}$ into a single phase or three phase variable frequency AC voltage $U_{out}$. Such single phase frequency converter may be connected to small single or three phase AC loads, such as a pump or fan motor 13. The inverter bridge 12 may be a full-wave bridge with pulse-width-modulated semiconductor switches V11 to V16, such as insulated gate bipolar transistor (IGBTs), and flywheel diodes D11 to D16 connected in inverse-parallel with the semiconductor switches. The semiconductor switches V11 to V16 are controlled with pulse-width modulation by means of a PWM control unit 14. The rectifier bridge 10 may be a full-wave diode bridge with four diodes D1 to D4 connected to the phase and neutral lines of the AC supply voltage $U_{in}$.

FIG. 1b presents some typical signal waveforms of a prior art single phase converter. The target of the motor control is normally to get the motor shaft torque to be as constant as possible in a constant operation point. For this target it is good if the DC intermediate circuit voltage is constant, because then the formation of the exact output voltage $U_{out}$ which is essential in determining the motor shaft torque, is easier. This is why the capacitance of the DC intermediate circuit capacitor Cdc is normally dimensioned to be very large. The DC intermediate circuit current Idc consists of pulses according to the inverter PWM operation. When the voltage $U_{dc}$ is constant and the motor operation point stable, the pulse train Idc is quite constant, as shown in FIG. 1b.

The smooth DC intermediate circuit voltage $U_{dc}$ causes the rectified supply AC voltage $U_{in}$ to be higher than the DC voltage $U_{dc}$ only for very short periods. This causes the supply phase current waveform $I_{in}$ to be very narrow and high pulse according to FIG. 1b, because the current $I_{in}$ can flow only when $U_{in}$ is higher than Udc. This kind of line current waveform causes problems; e.g., in component dimensioning, and it can cause electric noise problems in the supply line.

There are several known methods to reduce the supply line current problem. Extra filtering, consisting of reactors and capacitors, can be used. One known solution is the so-called PFC (Power Factor Correction) circuit shown in FIG. 2a. It consists of a reactor L21, a diode D21 and a semiconductor switch V21 such as an IGBT. The switch V21 is controlled so that the reactor current is as close as possible sinusoidal and in phase with the line voltage $U_{in}$ (see FIG. 2b). When using PFC, the DC intermediate circuit voltage $U_{dc}$ is normally constant and higher than the peak value of the line voltage $U_{in}$. EP-A2-1170853 discloses a single-phase AC-DC converter including a PFC power supply section, where a rectified current obtained by rectifying an electric current from an AC supply is switched, a DC—DC power supply section, where a direct current obtained by rectifying and smoothing an electric current from an AC supply is switched, a first switching element for conducting a switching operation in the PFC power supply section, a second switching element for conducting a switching operation in the DC—DC power supply section, a drive pulse generating circuit for generating first drive pulses for driving said first switching element and second drive pulses for driving said second switching element and a servo loop for controlling the drive pulse generating circuit.

Prior art solutions aim at maintaining a constant voltage $U_{dc}$ in the DC intermediate circuit by using a high-capacitance DC intermediate capacitor Cdc for intermediate energy storage. The ratings of the capacitors are generally determined by the capacitors' ability to withstand the electric current ripple and voltage loading applied to them and the required service lifetime. These requirements normally cause the DC capacitor components to be bulky and expensive.

Further, the line current in the supply AC mains in the prior art frequency converters is neither sinusoidal nor in phase with the supply voltage. For this reason the prior art single phase frequency converters can be provided with an active PFC (Power Correction Factor) circuit 15 in order to make the input current sinusoidal, and to compensate the power factor, so that the line current $I_{in}$ will be in phase with the line voltage $U_{in}$. However, such PFC circuits make the frequency converter more expensive and complicated.

The object of the prior art frequency converter is to control the output voltage $U_{out}$ so that the motor shaft torque is as smooth as possible. On the other hand it is known that in most applications where one phase motors have been used, e.g., in pump and fan drives, the shaft torque does not need to be smooth. This is obvious according to the one phase motor signal waveforms presented in FIG. 3, where u=line voltage, i=line current and P=motor power (P=u*i). Because both the voltage and current are sinusoidal, the power fed to the motor is sinusoidal also. Normally the load inertia is so high that the shaft speed remains about constant, which means that also the shaft torque fluctuation is similar to that of the power (P=ωT, where co is the shaft angular speed).

SUMMARY AND OBJECTS OF THE INVENTION

One object of the present invention is to eliminate the drawbacks of prior-art solutions, especially in applications which allow high fluctuation in the shaft torque, and to achieve a control arrangement that will minimize the capacitance of the DC intermediate capacitor even by a factor of 20 or more compared with the prior art capacitors.

A further object of the present invention is to achieve a control arrangement wherein the inventive PWM controller produces at least nearly sinusoidal line current.

In the present invention the frequency converter is controlled so that the curve of filtered average current in the DC intermediate circuit follows the curve of the rectified AC supply voltage. Further, the rectifier bridge is connected to the inverter bridge directly without a DC capacitor unit acting as an intermediate energy storage. Therefore also the line current $I_{in}$ is sinusoidal and is in phase with the line voltage $U_{in}$ so that the power factor $\cos\omega=1$ without a separate PFC circuit. The curve of the DC intermediate voltage follows the curve of the rectified sinusoidal line voltage. The curve of the active power fed to the load (and also the curve of the torque when the rotation speed is assumed to be constant) has the form $\sin^2(2\pi ft)$ (f=line frequency, t=time).

Since according to the present invention it is possible to connect the rectifier bridge to the inverter bridge directly without a DC capacitor unit acting as an intermediate energy storage, the DC intermediate capacitor Cdc and also the physical dimensions of the frequency converter can be minimized.

Although the frequency converter according to the present invention requires no capacitor for smoothing the intermediate circuit DC voltage, a capacitor with a low capacitance value may still be used in order to limit the voltage spikes produced in switching situations by the energy latent in the stray inductances of the DC intermediate circuit. Similarly, a filter unit consisting of inductors with a low inductance value and capacitors with a low capacitance value may be used on the supply line side to filter high-frequency harmonics from the supply current.

BRIEF DESCRIPTION OF THE DRAWINGS

In the following, preferred embodiments of the present invention will be described in detail by reference to the drawings, wherein.

DETAILED DESCRIPTION OF THE PREFERRED EMBODIMENTS

Figure 1A:
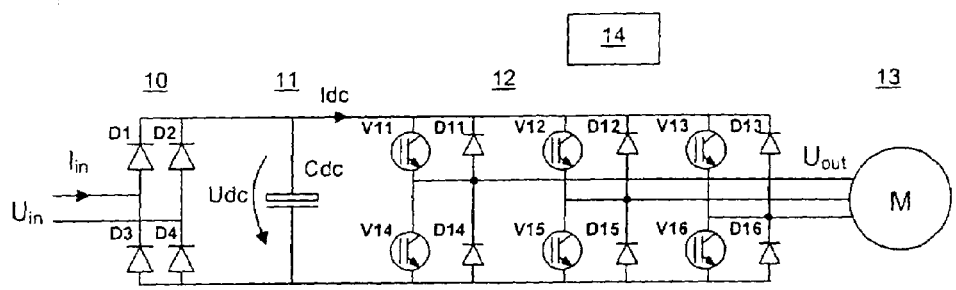
FIG. 1a presents a prior art single phase PWM frequency converter.
Figure 1B:
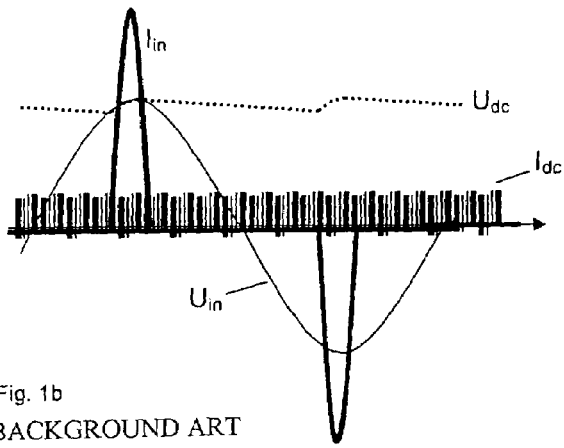
FIG. 1b illustrates typical waveforms of the line current and voltage and the DC intermediate current and voltage in a prior art single phase PWM frequency converter.
Figure 2A:
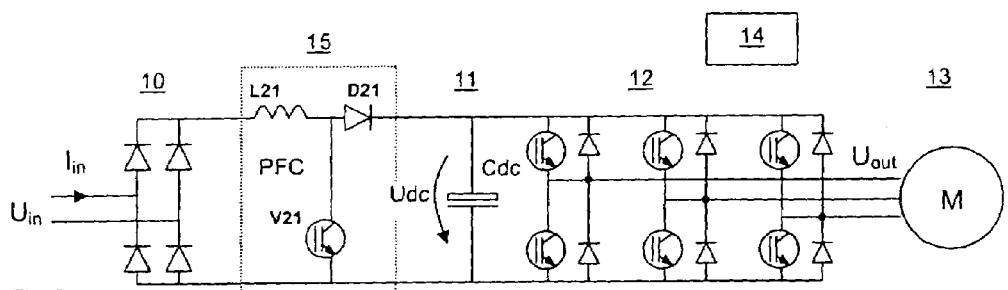
FIG. 2a presents a prior art single phase PWM frequency converter, where the line current waveform has been improved by using a PFC circuit.
Figure 2B:
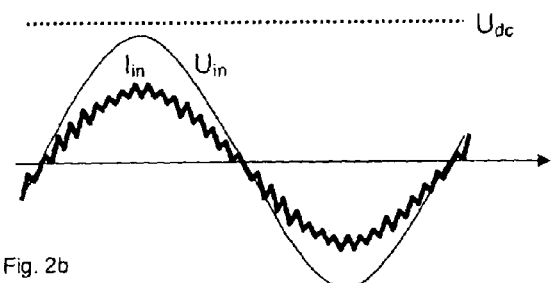
FIG. 2b illustrates typical waveforms of the line current and voltage and the DC intermediate voltage in a prior art single phase PWM frequency with a PFC circuit.
Figure 3:
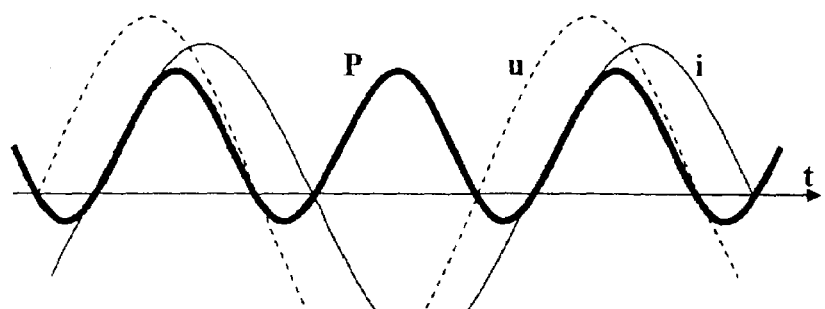
FIG. 3 illustrates typical waveforms of the line current and voltage and power of a one phase motor connected to a one phase line.
Figure 4A:
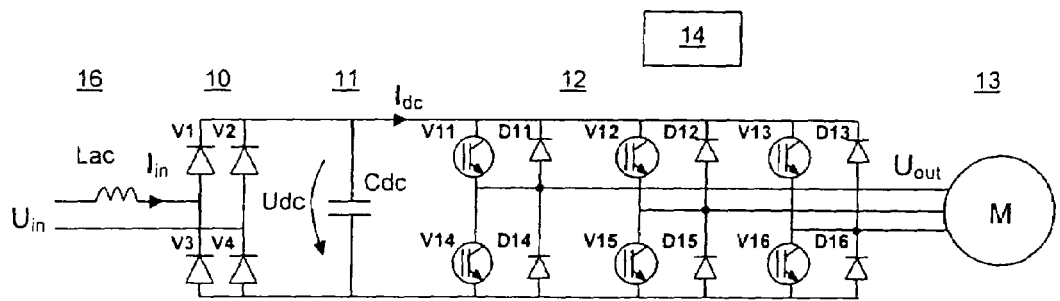
FIG. 4a presents a single phase PWM frequency converter, according to the present invention.

FIG. 4a presents a single phase PWM frequency converter according to the present invention. As in the prior art (see FIG. 1a), the PWM frequency converter of the present invention includes a rectifier bridge 10 for rectifying an AC voltage $U_{in}$ of a supply line to a DC voltage $U_{dc}$ for a DC intermediate circuit 11 and a three phase inverter bridge 12 for the inversion of the intermediate circuit DC voltage $U_{dc}$ into a single phase or three phase variable frequency AC voltage $U_{out}$. The frequency converter is connected to small three phase AC load, such as a pump or fan motor 13. The inverter bridge 12 is a full-wave bridge with pulse-width-modulated semiconductor switches V11 to V16, such as insulated gate bipolar transistors (IGBTs), and flywheel diodes D11 to D16 connected in inverse-parallel with the semiconductor switches. The semiconductor switches V11 to V16 are controlled with pulse-width modulation by means of a PWM control unit 14. The rectifier bridge 10 may be a full-wave diode bridge with four diodes D1 to D4 connected to the single phase AC supply voltage $U_{in}$. A small capacitor Cdc, which does not function as an energy storage, but only functions to reduce voltage spikes during IGBT switching, is connected in the DC intermediate circuit. A small reactor Lac may be connected between the supply voltage $U_{in}$ and the rectifier bridge 10 in order to reduce high-frequency harmonics and noise caused by the frequency converter operation to the line.

Figure 4B:
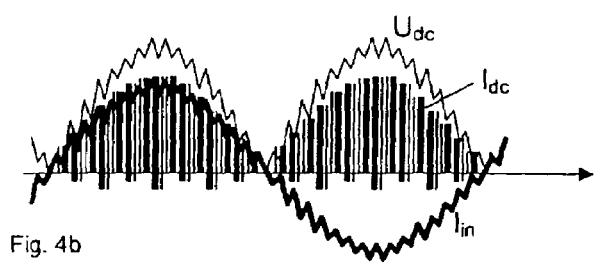
FIG. 4b illustrates typical waveforms of the line current and the DC intermediate current and voltage in a single phase PWM frequency converter according to the present invention.

According to the invention the output voltage $U_{out}$ and the output frequency $f_{out}$ of the frequency converter are controlled so that the curve of filtered average current $I_{dc}$ in the DC intermediate circuit follows the curve of the rectified AC supply voltage $U_{dc}$. Further, because there is no energy storage capacitor in the DC intermediate circuit also the line current $I_{in}$ is sinusoidal and is in phase with the line voltage $U_{in}$ so that the power factor $\cos\omega=1$. Also the curve of the DC intermediate voltage Udc follows the curve of the rectified sinusoidal line voltage (see FIG. 4b). Because both the DC intermediate circuit voltage $U_{dc}$ and current $I_{dc}$ follow the line voltage sinusoidal waveform, the curve of the power fed to the motor (and also the curve of the torque when the rotation speed is assumed to be constant) has the form $\sin^2(2\pi ft)$ (f=line frequency, t=time).

For the proper operation of the frequency converter the motor has to be controlled so that the fundamental wave of the output voltage is maintained essentially in a right value determined by the motor operating point. It may be controlled, e.g., so that in average the relation $U_{out}/f_{out}$, where $U_{out}$ is the output voltage and $f_{out}$ the output frequency, is kept constant.

The control unit 14 has thus two main tasks according to this invention; it has to control the output voltage $U_{out}$ and frequency $f_{out}$ so that the average voltage value is correct and the average DC intermediate circuit current Idc follows the rectified line voltage waveform $U_{dc}$.

The motor M can be either a single phase or three phase motor. In the single phase operation the phase into which a start capacitor is normally connected is controlled at the start with the third phase switch of the inverter in order to produce a sufficient start torque. A separate start capacitor is thus not needed.

It is obvious to the person skilled in the art that the embodiments of the invention are not restricted to the examples presented above, but that they can be varied within the scope of the following claims. Besides IGBTs, the fully controllable semiconductor switches used may also consist of other fully grid-controlled semiconductor switches, i.e. switches that can be turned on and off, such as MOSFETs.

Such variations are not to be regarded as a departure from the spirit and scope of the invention, and all such modifications as would be obvious to one skilled in the art are intended to be included within the scope of the following claims.

The invention claimed is:

1. A method of controlling a voltage controlled PWM (Pulse Width Modulated) frequency converter comprising a single phase rectifier bridge (10) connectable to a sinusoidal single phase supply, a DC intermediate circuit (11) and a controlled inverter bridge (12) for generating an AC output voltage ($U_{out}$) with varying amplitude and frequency to a load, said inverter bridge (12) having PWM controlled semiconductor switches (V11–V16) and flywheel diodes (D11–D16) connected in inverse-parallel with the semiconductor switches, the method comprising the steps of:

controlling the frequency converter so that the supply line current ($I_{in}$) is substantially sinusoidal and in phase with the supply line voltage ($U_{in}$), controlling the inverter bridge so that a curve of filtered average current ($I_{dc}$) in the DC intermediate circuit substantially follows a curve of a rectified AC supply voltage ($U_{dc}$), and directly connecting the rectifier bridge is (10) to the inverter bridge (12), wherein a curve of the power fed to a load is formed substantially as $\sin^2(2\pi ft)$ (f=line frequency t=time).

2. A method as defined in claim 1, further comprising the step of:

providing the DC intermediate circuit with a DC capacitor unit having a low capacitance value, the DC capacitor being for limiting voltage spikes produced in switching situations, but not acting as an energy source.

3. The method as defined in claim 1, further comprising the step of:

connecting two phase switches of the inverter bridge to two windings of a single phase motor and connecting a third phase switch of the inverter bridge to a third phase winding of the single phase motor for producing a start torque through the third phase winding in order to avoid a use of a separate start capacitor in the motor.

4. A voltage controlled PWM (Pulse Width Modulated) frequency converter comprising:

a single phase rectifier bridge (10) connectable to a sinusoidal single phase supply, a DC intermediate circuit (11), a controlled inverter bridge (12) for generating an AC output voltage with varying frequency to a load and a PWM controller unit (14), said inverter bridge (12) having PWM controlled semiconductor switches (V11–V16) and flywheel diodes (D11–D16) connected in inverse-parallel with the semiconductor switches, wherein the PWM controller unit (14) controls the frequency converter so that the supply line current ($I_{in}$) is substantially sinusoidal and in phase with a supply line voltage ($U_{in}$), wherein the PWM controller unit (14) controls the inverter bridge so that the curve of filtered average current ($I_{dc}$) in the DC intermediate circuit substantially follows a curve of a rectified AC supply voltage ($U_{dc}$), wherein the rectifier bridge is (10) directly connected to the inverter bridge, and wherein a curve of a power fed to a load is formed substantially as $\sin^2(2\pi ft)$ (f=line frequency t=time).

5. The voltage controlled PWM (Pulse Width Modulated) frequency converter as defined in claim 4, wherein the DC intermediate circuit is provided with a DC capacitor unit having a low capacitance value, the DC capacitor being for limiting voltage spikes produced in switching situations.

6. The voltage controlled PWM (Pulse Width Modulated) frequency converter as defined in claim 4, further comprising:

a filter unit consisting of inductors and capacitors on the supply line side in order to filter off high-frequency harmonics from a supply current.

7. The voltage controlled PWM (Pulse Width Modulated) frequency converter as defined in claim 4, wherein two phase switches of the inverter bridge are connected to windings of a single phase motor and third phase switch of the inverter bridge produces a start torque through a third phase winding of the single phase motor in order to avoid a use of a separate start capacitor in the motor.

* * * * *